US007676571B2

(12) United States Patent
LeMay et al.

(10) Patent No.: US 7,676,571 B2
(45) Date of Patent: Mar. 9, 2010

(54) SYSTEM FOR MONITORING CABLE INTERFACE CONNECTIONS IN A NETWORK

(75) Inventors: Charles R. LeMay, Portsmouth, NH (US); Clifford Kelly, Wells, ME (US); Martin Doering, Watertown, MA (US); Donald Myers, Brockton, MA (US)

(73) Assignee: Draeger Medical Systems, Inc., Andover, MA (US)

( * ) Notice: Subject to any disclaimer, the term of this patent is extended or adjusted under 35 U.S.C. 154(b) by 726 days.

(21) Appl. No.: 11/531,153

(22) Filed: Sep. 12, 2006

(65) Prior Publication Data

US 2007/0059971 A1   Mar. 15, 2007

Related U.S. Application Data

(60) Provisional application No. 60/716,793, filed on Sep. 13, 2005.

(51) Int. Cl.
*H01R 4/24* (2006.01)
(52) U.S. Cl. ................................ 709/224; 709/200
(58) Field of Classification Search ........... 709/224, 709/200
See application file for complete search history.

(56) References Cited

U.S. PATENT DOCUMENTS

| | | | |
|---|---|---|---|
| 4,025,906 A | 5/1977 | Riikonen | |
| 5,371,743 A | 12/1994 | DeYesso et al. | |
| 5,434,775 A | 7/1995 | Sims et al. | |
| 5,689,242 A | 11/1997 | Sims et al. | |
| 6,026,354 A | 2/2000 | Singh et al. | |
| 6,179,644 B1 | 1/2001 | Adams et al. | |
| 6,472,770 B1 | 10/2002 | Pohjola | |
| 6,735,630 B1* | 5/2004 | Gelvin et al. | 709/224 |
| 6,771,164 B1 | 8/2004 | Fink | |
| 6,957,974 B2 | 10/2005 | Bruski et al. | |
| 2002/0194417 A1* | 12/2002 | Suzuki et al. | 710/305 |
| 2004/0073597 A1* | 4/2004 | Caveney et al. | 709/200 |
| 2004/0165206 A1 | 8/2004 | Aoki et al. | |

OTHER PUBLICATIONS

Mendelson G. "All You Need To Know About Power Over Ethernet (PoE) and the IEEE 802.3af Standard" Internet citation, Jun. 2004, XP002372480.

* cited by examiner

*Primary Examiner*—Quang Nguyen
*Assistant Examiner*—Andrew Woo
(74) *Attorney, Agent, or Firm*—Rissman Hendricks & Oliverio, LLP

(57) ABSTRACT

A system monitors cable interface connections in a network. An individual cable interface connection includes a connection between a cable and an associated device in the network. The system includes a plurality of individual interface controllers. The plurality of individual interface controllers monitor one or more cable interface connections in a network. This plurality of interface controllers include a first interface controller for automatically acquiring device type identification data from a second interface controller which is monitoring a connection between a cable and an associated device in the network. The device type identification data is acquired via the cable and the first and second cable interface connections at the end of the cable. The device type identification data supports identification of the device associated with the second cable interface connection. The first interface controller supports communication between individual interface controllers in the network on a first communication link. The system further includes a second communication link, different from the first communication link, being conveyed via the plurality of cable interface connections in the network.

16 Claims, 4 Drawing Sheets

SYSTEM FOR MONITORING CABLE INTERFACE CONNECTIONS IN A NETWORK

CROSS-REFERENCED TO RELATED APPLICATIONS

This is a non-provisional application of U.S. Provisional Application Ser. No. 60/716,793 filed Sep. 13, 2005.

FIELD OF THE INVENTION

The present invention relates generally to the field of network interconnectivity, and more particularly to the provision of power, control, status, monitoring and supervisory functions in a network.

BACKGROUND OF THE INVENTION

In network based control and monitoring systems problems arise in both the permanent and temporary addition of devices to the network. A typical existing networking system employs numerous individual cables that connect to interconnected medical devices which itself frequently requires the manual entry of system configuration information via switches, software, and jumpers. Such existing systems are complex, expensive, inherently error prone and burdensome for end users to manage, configure and expand. A system according to invention principles addresses these deficiencies and related problems.

BRIEF SUMMARY OF THE INVENTION

In accordance with principles of the present invention, a system monitors cable interface connections in a network. An individual cable interface connection includes a connection between a cable and an associated device in the network. The system includes a plurality of individual interface controllers. The plurality of individual interface controllers monitor one or more cable interface connections in a network. This plurality of interface controllers include a first interface controller for automatically acquiring device type identification data from a second interface controller which is monitoring a connection between a cable and an associated device in the network. The device type identification data is acquired via the cable and the first and second cable interface connections at the ends of the cable. The device type identification data supports identification of the device associated with the second cable interface connection. The first interface controller supports communication between individual interface controllers in the network on a first communication link. The system further includes a second communication link, different from the first communication link, being conveyed via the plurality of cable interface connections in the network.

DETAILED DESCRIPTION OF THE INVENTION

A processor, as used herein, operates under the control of an executable application to (a) receive information from an input information device, (b) process the information by manipulating, analyzing, modifying, converting and/or transmitting the information, and/or (c) route the information to an output information device. A processor may use, or comprise the capabilities of, a controller or microprocessor, for example. The processor may operate with a display processor or generator. A display processor or generator is a known element for generating signals representing display images or portions thereof. A processor and a display processor comprises any combination of, hardware, firmware, and/or software.

An executable application, as used herein, comprises code or machine readable instructions for conditioning the processor to implement predetermined functions, such as those of an operating system, cable interface connection monitoring system or other information processing system, for example, in response to user command or input. An executable procedure is a segment of code or machine readable instruction, subroutine, or other distinct section of code or portion of an executable application for performing one or more particular processes.

A user interface (UI), as used herein, comprises one or more display images, generated by the display processor under the control of the processor. The UI also includes an executable procedure or executable application. The executable procedure or executable application conditions the display processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to the processor. The processor, under control of the executable procedure or executable application manipulates the UI display images in response to the signals received from the input devices. In this way, the user interacts with the display image using the input devices, enabling user interaction with the processor or other device.

Figure 1:
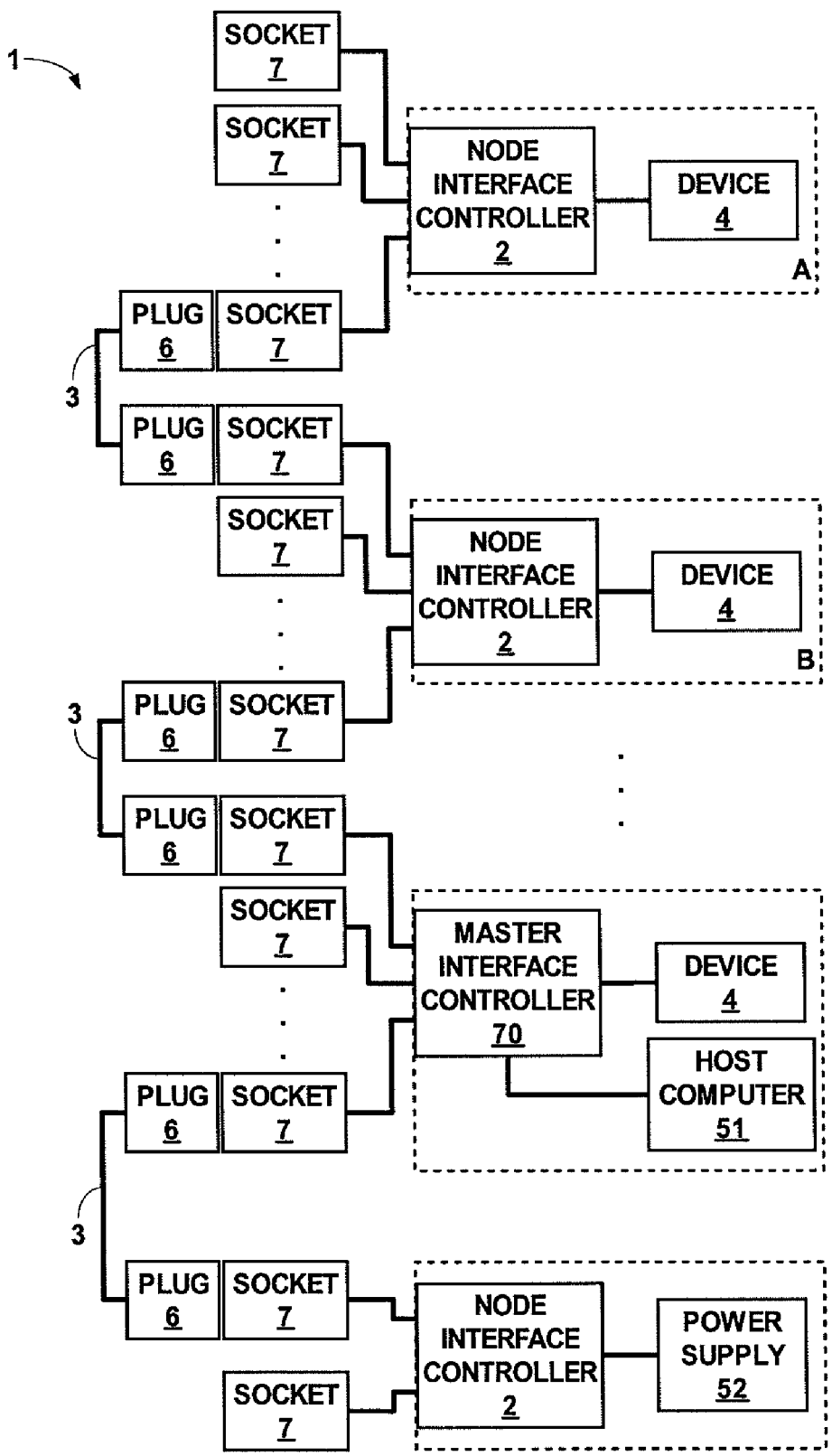
FIG. 1 is a diagram of a network including devices interconnected via a plurality of nodes coupled to a network cable by means of a series of node interface controllers according to the principles of the present invention.

FIG. 1 illustrates a system for monitoring cable interface connections in a network 1. An individual cable interface connection is a connection between a cable 3 and an associated device 4 in the network. FIG. 1 illustrates a plurality of individual interface controllers 2, 70. These interface controllers 2, 70 monitor one or more cable interface connections in the network 1. The interface controllers 2, 70 include a first interface controller 70 which can automatically acquire device 4 type identification data from a second interface controller 2 monitoring a connection between the cable 3 and an associated device 4 in the network 1, in a manner to be described in more detail below. The device type identification data is acquired via the cable 3 and the first and second cable interface connections at the ends of the cable 3. The device type identification data supports identification of the device 4 associated with the second cable interface connection 2. The plurality of individual interface controllers 2, 70 also support communication between individual interface controllers in the network via a first communication link, described below. The system also includes a second communication link, different from the first communication link, also being conveyed by the plurality of cable interface connections in the network 1.

Referring to FIG. 1, a data and power distribution network 1 is depicted which includes a plurality of node interface controllers 2, 70 that permit the interconnection of various associated devices 4, such as medical devices, to a network system cable 3. The node interface controllers 2, 70, are connected to a plurality of system cable sockets 7, which are connectable to corresponding system cable plugs 6. In one embodiment, a node interface controller 2 may be connected to four system cable sockets 7, although one skilled in the art understands that in general the node interface controller 2, 70 may be connected to two or more system cable sockets 7. The node interface controllers 2, 70, may be physically integrated with the associated device 4 in the same enclosure including the system cable sockets 7, as illustrated in node A and node B of FIG. 1. In the illustrated embodiment, the system cable sockets 7 are identical.

A system cable 3 includes a first and second system cable plug 6 connected to respective ends of a cable carrying a plurality of signal conductors. The system cables 3 are constructed identically. In the case of signal conductors carrying communications signals from a transmitter to a receiver and vice versa, the conductors are crossed-over within the cable so that the transmitter in one node interface controller 2 is connected to the receiver in the other node interface controller 2. The system cable plugs 6 are fabricated to plug into the respective system cable sockets 7 as described above. A plurality of system cables 3 may be used to interconnect node interface controllers 2, 70 and their associated devices 4 in the network 1.

A network power supply 52 is also includes a node interface controller 2. In FIG. 1, the node interface controller 2 of the network power supply 52 includes two system cable sockets 7. One skilled in the art understands that the network power supply 52 includes a connection to power system mains, a power supply circuit, battery backup and other associated circuitry and equipment to maintain power for the network. In the illustrated embodiment, the network power supply 52 provides a 24 volt supply voltage.

Nodes may be interconnected in a star configuration, where a plurality of nodes are connected to a central node. This is illustrated in FIG. 1 in which nodes B and the network power supply 52 node are both connected to the master interface controller 70 node by respective system cables 3. Nodes may also be interconnected in a daisy-chain configuration in which nodes are connected in a serial fashion. This is illustrated in FIG. 1 in which the master interface controller 70 node is connected to the node B, and the node B is connected to the node A. One skilled in the art understands that either or both of these network configurations may be used to interconnect nodes in the network 1.

In general, the network 1 further includes a host computer which provides overall command and control of the network 1. A first node interface controller, designated the master interface controller 70, includes a dedicated communications link to a host computer 51. As described above, the master interface controller 70 may be integrated in the same enclosure with the host computer 51. System cable sockets 7 may be made available on this enclosure to which system cable plugs 6 may be connected. The first interface controller, e.g. master interface controller 70, monitors the plurality of cable interface connections in the network. That is, the first interface controller 70 operates as a master interface controller in a manner to be described in more detail below. The master node interface controller 70 may include an associated device 4 and interconnect of the associated device 4 to the system cable 3. or may operate as an independent node with no device 4 attached.

Respective node interface controllers 2 pass power and data signals through the system cables 3 via a system cable plugs 6 and system cable sockets 7. A typical data signal transmitted through a node interface controller 2 is a patient monitoring signal such as an alarm signal or a patient vital sign. The node controller 2 may also transmit data signals via system cable 3 in accordance with standard data transmission protocols and is capable of determining the type of device 4 to which it is connected. The cable 3 will typically serve as the conduit for pulsed or digitized signals in which signal levels are identified by the node interface controller 2 as data representing node addresses and other relevant parameters. A particular node interface controller 2 is typically programmed to recognize data transmitted over cable 3 and to execute specific interface controller functions in response to the received data. The node interface controller 2 determines when and if the node interface controller 2 is attached properly to both the system cable 3 and a particular medical device 4 in order to intelligently control power switching and establish data communications.

Figure 2:
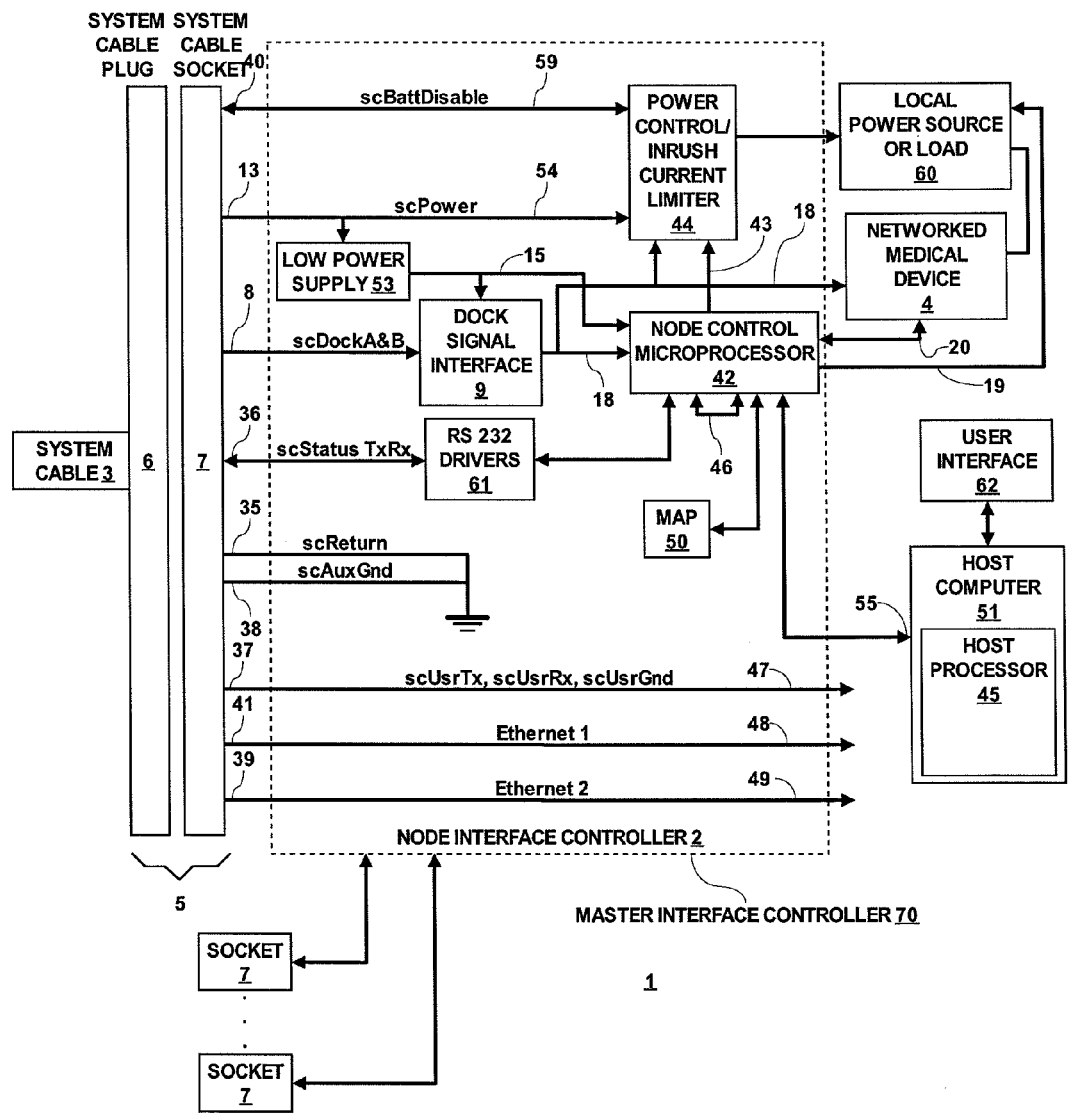
FIG. 2 is a diagram of a single node interface controller as illustrated in FIG. 1 according to principles of the present invention.

In FIG. 2, the basic elements of a representative interface controller 2 can be appreciated. A system connector 5 is formed to include a system cable socket 7 and a system cable plug 6. The network system cable 3 terminates at the cable plug 6 which is adapted to electrically interconnect the conductors of cable 3 to the cable socket 7. In one embodiment of the present invention, the cable socket 7 includes at least nine system cable conductors or paths which link the cable 3 to the interface controller 2. Specifically, a conductor 8, carrying docking signals scDockA and scDockB, is interconnected to the dock signal interface 9. The system cable 3 conductor 8 provides the docking signals to the dock signal interface 9. The dock signal interface 9 produces a logical output signal 18 that indicates that the system cable 3 is physically and electrically connected to the node interface controller 2 and to a corresponding second node interface controller 2 (not shown) at the other end of the system cable 3. That is, when the system cable 3 is not properly connected to the node interface connector 2, or to the second node interface controller 2 (not shown), the logical output signal 18 has a logical 0 value. When the system cable 3 is properly connected to the node interface connector 2, and to the second node interface controller 2 (not shown), the logical output signal 18 has a logical 1 value. This signal may be used to verity proper connection to the system cable 3 prior to attempting any data transfer between the network 1 and medical device 4.

As described above, in a preferred embodiment, the interface controller 2 includes at least nine separate conduction paths 8, 13, 35, 36, 37, 38, 39, 40 and 41 residing within the system cable 3. The system cable plug 6 and system cable socket 7 are designed with staggered pins, i.e. pins of differing lengths, for making the connections of the conduction paths 8, 13, 35, 36, 37, 38, 39, 40 and 41 between the system cable 3 and the interface node controller 2. More specifically, in the illustrated embodiment, the signals on conductor 8 are supplied to pins which are shorter than the other pins. Consequently, in operation, the signals appearing on the conductors 13, 35, 36, 37, 38, 39, 40 and 41 in the system cable 3 make contact with the node interface controller 2 before the signals that are present on conductor 8. Consequently, as the system cable plug 6 is being inserted into the system cable socket 7, signal connections are made on the other conduction paths 13, 35, 36, 37, 38, 39, 40 and 41 are established before the signal connection is made on the conduction path 8. In one embodiment conductors 35 and 38 (scReturn and scAuxGnd respectively) are grounds.

Specifically, one of the other conduction paths, conduction path 13 (scPower) carries network power to the node interface controller 2. The network power signal 13 is coupled to a low-power power supply 53, which, in turn, supplies power to a node control microprocessor 42. The node control microprocessor 42, therefore, is powered-on before the dock signal interface 9 receives docking signals on conductor 8. The node control microprocessor 42, thus, is initialized and operating before the dock signal interface 9 can generate the logical docking signal on conductor 18.

When the presence of a logical 1 signal on conductor 18 is sensed by the node control microprocessor 42, the microprocessor 42 is then able to subsequently switch on a local power supply or load 60 via signal path 19 and/or to initiate receipt of network power from conductor 13 (scPower) via signal path 43 in a controlled manner as is appropriate for the node. This functionality prevents the formation of electrical arcing at the system connector 5, prevents transient power disturbances that could disrupt other equipment already operating within the network 1 and allows the node interface controller 2 to implement a "hot swap" or power on functionality at a system wide level.

Conversely, when the system cable 3 is unplugged from a particular node controller 2, the staggered pins in the system cable plug 6 and system cable socket 7 carrying the docking signals scDockA and scDockB are disconnected first. Thus, the undocked signal (i.e. logical 0 signal) appearing on conductor 18 appears before the other conductors become disconnected. The logical 0 signal appearing on conductor 18 is serves as a signal to the node control microprocessor 42, which in turn sends control signals to circuitry in the node such as the local power source or load 60 and/or the inrush current limiter 44, for example, to take the appropriate consequent action such as removing power.

The respective node interface controllers 2 are manufactured identically, except for configuration jumpers, e.g. 46, which are permanently set at the time of manufacture. As described above, the respective node interface controllers 2 may be physically integrated with their associated devices in the same enclosures. The node control microprocessor 42 in the node interface controller 2 reads the presence, absence, or position of configuration jumpers (e.g. 46) the node control microprocessor 42 to determine the particular purpose of the node in which the node control microprocessor 42 is fabricated. The position of the jumpers (e.g. 46) permits the node control microprocessor 42 to operate in a manner that is appropriate for the particular node interface controller 2. Because the jumpers are fabricated at the time of manufacture, and are not set by installation or field personnel, they cannot be set incorrectly by such personnel.

For example, at least one interface controller 2 is identified within a hierarchy of a plurality of interface controllers 2 by means of at least one jumper connection (e.g. 46) that is configured within the interface controller 2. That is, at least one node interface controller 2 is designated a master interface controller 70 by means of configuration jumpers (e.g. 46). In addition, at least one interface controller 2 may be associated with a particular type of device 4 within a hierarchy of a plurality of interface controllers 2 by means of at least one jumper (e.g. 46) that is configured within the interface controller 2. That is, the configuration of the jumpers (e.g. 46) is dependent on the particular peripheral medical equipment 4 that is attached to the node controller 2, and is based on characteristics of the device 4, including data communications parameters such as parity, baud rate, and other device 4 characteristics. The setting of the jumpers (e.g. 46) also informs the node control microprocessor 42 regarding the quantity of power to be allocated to the operation of the particular node interface controller 2, which is then able to communicate this information to the master controller 70.

In FIG. 2, the node interface controller 2 designated as master interface controller 70 is illustrated. As described above, the master interface controller 70 includes a dedicated link to a host computer 51 which includes a host processor 45. The host processor 45 is normally operated by or is a part of an intelligent host computer 51 which provides access to a user interface 62, and which is able to access an executable application that controls overall operation of the network 1 under the control of a user. The host processor 45 communicates with the node control microprocessor 42 via the dedicated link to receive data, and transmit data and control commands, related to the network 1.

The individual interface controller 2 of the plurality of individual interface controllers 2 designated the master controller 70, has supervisory responsibility over the entire network 1 with respect to monitoring and controlling connectivity and power distribution. Other aspects of the network may be controlled by the master interface controller 70 as well. The individual interface controller of the plurality of individual interface controllers designated the master controller 70 uses device type identification data acquired as described above, in compiling a map 50 of the network 1 which includes data which indicates the plurality of individual devices in the network 1.

The power consumption of devices of different types are typically known in advance. The compiled map, thus, may include data identifying individual power consumption of individual devices of the plurality of individual devices from the predetermined data associating a device type with a corresponding power consumption. Further, the map 50 may include data identifying the physical location of the individual device 4 of the plurality of individual devices based on predetermined data associating the type of device with an individual cable interface connection and a physical location. In particular, the predetermined data associates the type of device with an individual cable interface connection, and an associated electronic address and a physical location.

The device type identifier may also include a priority level indicator which is integrated into the map 50 in order to create a ranking of devices. In the event that the network 1 is unable to support the simultaneous operation of all of the devices 4 which may potentially be connected to the network 1, the priority level indicators in the map 50 permit the host processor 45 to instruct the node interface controllers 2 regarding operations, such as power management and data communications, within the network 1. That is, higher priority devices 4 may be operated while lower priority devices 4 may be disabled.

Figure 3:
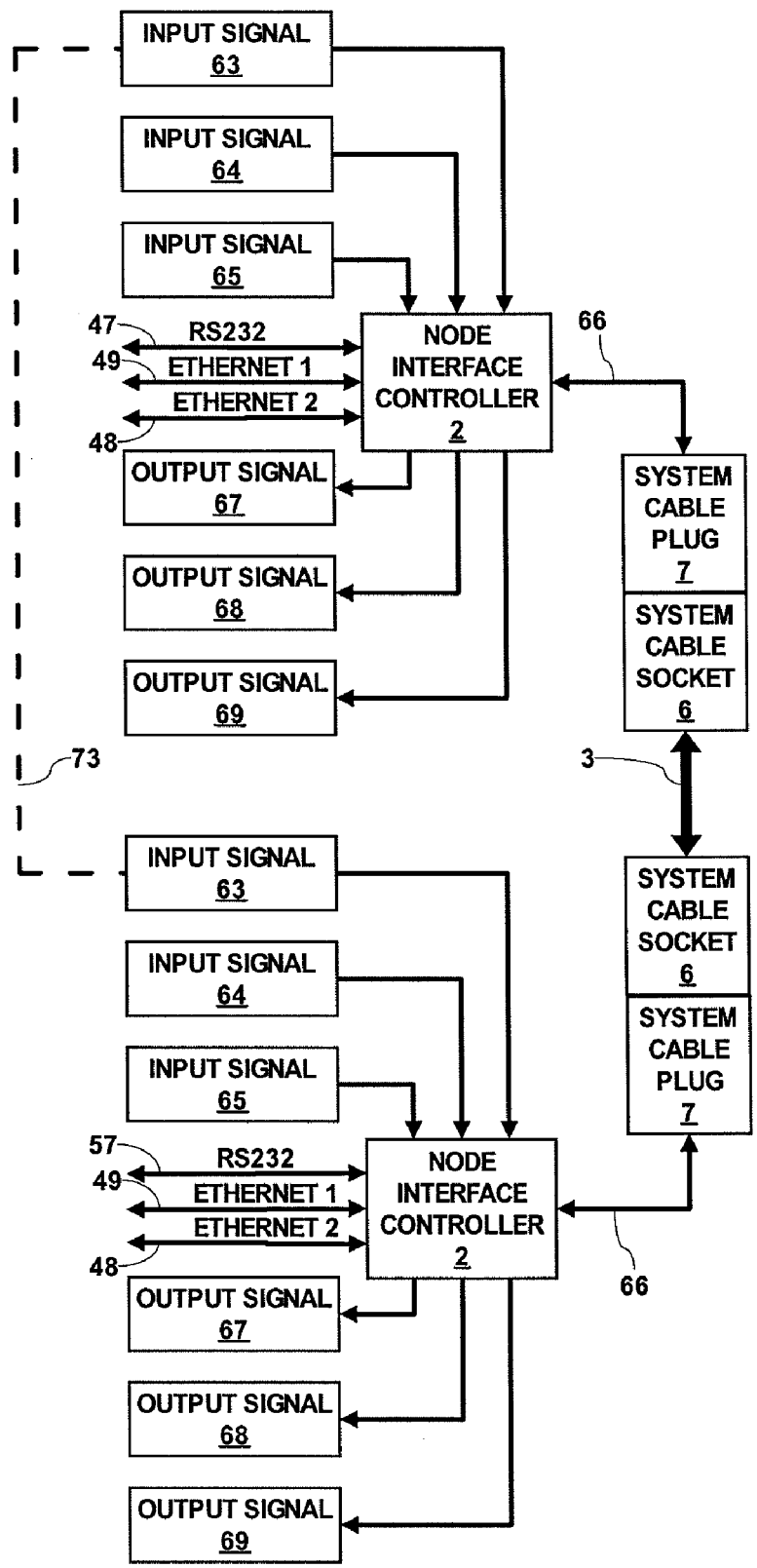
FIG. 3 is a diagram of a two node network utilizing the node interface controllers illustrated in FIG. 2 according to principles of the present invention.

Referring concurrently to FIG. 2 and FIG. 3, one can appreciate that a network of two node interface controllers 2 includes a method of communication between the individual node control microprocessors 42 that reside within the node controllers 2. For example, three communication links are embodied in the system cable 3: an Ethernet 1 link via conductor 41, an Ethernet 2 link via conductor 39 and an RS232 link via conductor 37 in the system cable 3. These are made available in the node interface controller 2 on conductors 48, 49 and 47, respectively. The node control microprocessor 42 in a node interface controller 2 may be interconnected via one of the communications links in the system cable 3 to another node control microprocessor 42 in another node interface controller 2 on the network 1. Consequently, a node control microprocessor 42 may respond to the receipt of a real signal input, such as input signal 63, by communicating that signal to other node control microprocessors 42 in other node interface controllers 2 in the network via the communications links Ethernet 1, Ethernet 2 and/or RS232. The other node control microprocessor 42 may respond to that signal in the same way as if that signal had been a real input signal at that node interface controller 2. A real signal input 63 at a node interface controller 2, thus becomes a virtual signal input 63 at the other node control microprocessor 42, and indeed at the plurality of node control microprocessors 42 in the plurality of node interface controllers 2 in the network 1.

A virtual signal path 73, illustrated as a dashed line in FIG. 3, is created for the real input signal 63 by means of the system cable 3. The node interface controller 2 provides at least one dedicated input path 20 for the real input signals (e.g. 63, 64 and 65) received from the device 4 in the node controller 2; and for the real output signals (e.g. 67, 68 and 69) supplied to the device 4. Virtual input and output signal are communicated to the node control microprocessor 42 via the communication links (e.g. Ethernet1, Ethernet2, RS232) in the system cable 3.

In some cases, the executable application in the node control microprocessor 42 may process a virtual input signal (e.g. 73) in such a manner as to cause the creation of an output signal (e.g. 68), without regard to the node interface controller 2 which received the real input signal (e.g. 63). Further the executable applications in the node control microprocessors 42 in the plurality of node interface controllers 2 may respond to the virtual input signal (e.g. 73) in the same manner. In such a configuration, for example, an output signal (e.g. 68) will be generated at the respective node controllers 2 within the network 1 no matter where the real signal (e.g. 63) was received. In a network with node control microprocessors 42 programmed in this manner, an output signal (e.g. 68) generated by the plurality of node interface controllers 2 represents the logical OR of the signals appearing at any of the other node controllers 2.

For example, a patient monitoring signal may be communicated to the plurality of individual interface controllers 2 via a first communications channel, e.g. the RS232 communications link. This patient monitoring signal may be at least one of: (a) an alarm signal and/or (b) a patient vital signal representative signal. Taking as an example a patient alarm signal, any node interface controller 2 which receives a patient alarm input signal (e.g. 63) from a device 4 can alert the network 1 to the alarm condition by forwarding a virtual "alarm in" signal (e.g. 73) to every other node controller 2. An "alarm out" signal (e.g. 68) would then be generated at the plurality of node interface controllers 2 as if the real input signal (e.g. 63) had actually originated at the individual node interface controller 2. This "alarm out" signal may be used to set an active alarm condition, such as activation of a light, buzzer, beeper, etc. Thus, a patient monitoring signal which is an alarm signal may be used to initiate an action by a device 4 in the network 1, or to set to an active alarm condition by any interface controller 2 of the plurality of individual interface controllers 2. Logic that is more complex than the OR function, described above, may be applied to the node controller virtual input signals; or particular node interface controllers 2 may be programmed to respond in a unique fashion to a specific virtual input signal.

Figure 4:
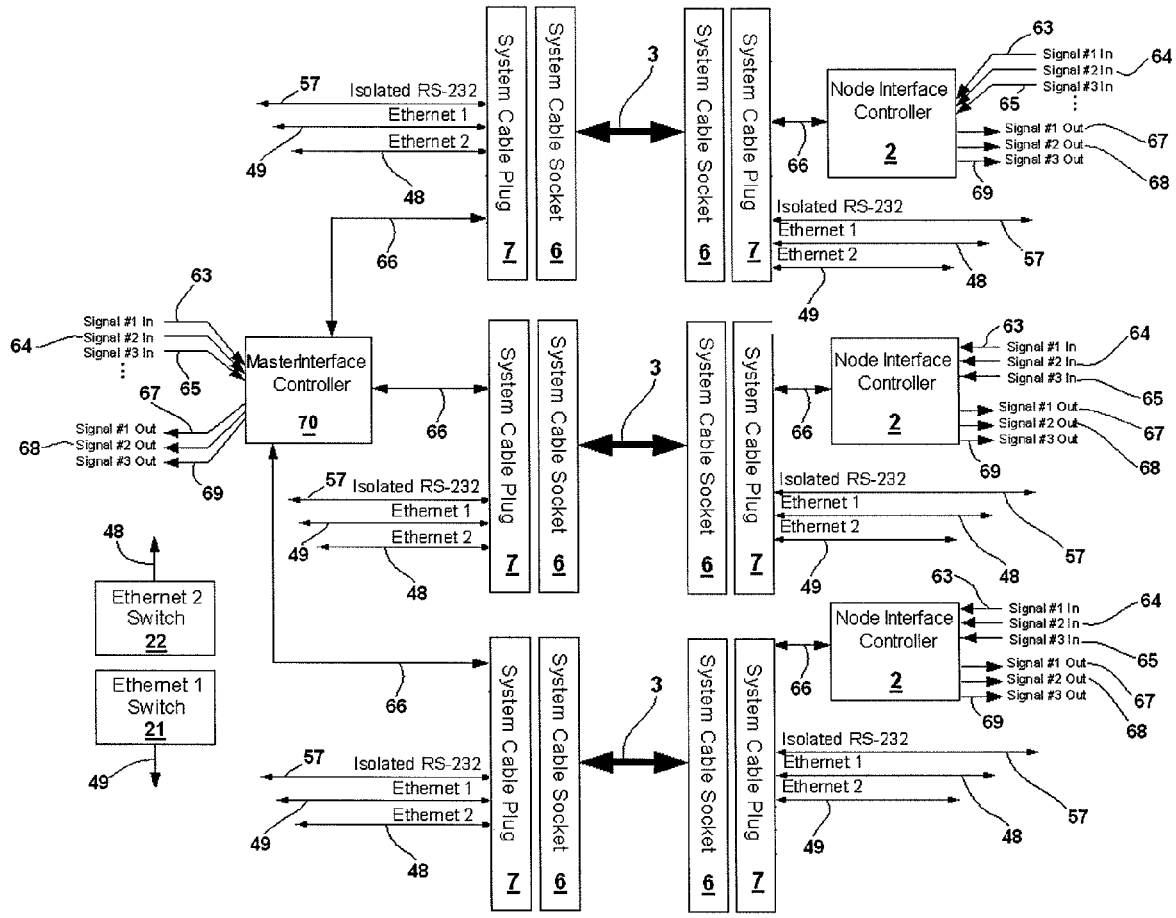
FIG. 4 is an illustration of a multiple node network utilizing the node interface controllers depicted in FIG. 2 according to principles of the present invention.

Referring also to FIG. 4, a more complex arrangement of node controllers 2 is depicted which illustrates that numerous arrangements of node controllers are possible. In particular, at least one of the node controllers 2 is seen to be simultaneously connected via connections 66 to more than one system cable 3 and hence is able to interface directly with and control the data processing occurring at more than one system cable 3. This is a star configuration described above.

Referring to FIG. 2, the node control microprocessor 42 in the node interface controller 2 is powered by a dedicated low-power voltage supply 53 (FIG. 2), which derives its power directly from a network power conductor 54 (scPower) provided by the system 1 via conductor 13 in the system cable 3. The network supply power typically has a nominal value of 24 volts. Whenever the system 1 has access to the 24 volt network power supply 52, and the node interface controller 2 is interconnected to the network 1, the interconnected node controller 2 is operating. The array of node controllers 2 operates independently of any particular medical device 4 connected to them, and functions even if no device 4 is present or operating. The node controller 2 continuously monitors the network 1 for changes in network topology and communicates any changes to the master interface controller 70 which is thereby able to update the system map 50.

Prior to the initial activation of the network 1, the master interface controller 70 contains the previously constructed system map 50 which contains the power budget for the entire network 1. If the network power supply 52 reports adequate power capability, the host computer 51 provides a signal to the master interface controller 70 which requests activation of the network 1. In response to the network activation request, the master interface controller 70 broadcasts a message to the plurality of node interface controllers 2, which in turn activate the devices 4 associated with that node interface controller 2. In the event that the host processor 45 determines that activating the network 1 will overload the network 1 based on the predicted loads and available power resources, the host processor 45 will not request that the master interface controller 70 apply power to the network 1. Instead, the host processor 45 will report the potential power deficiency situation to the host computer 51 so that remedial action can then be taken via the user interface 62.

Whenever an additional device 4 is connected to an already operating network 1, the node controller 2 associated with the device 4 communicates with the master interface controller 70 to obtain permission to apply power to the particular device 4 based on the individual device type identifier. The master interface controller 70 permits the application of power to the device 4 if sufficient surplus power capacity is available in network power supply 52, thereby preventing an overload of the network power supply 52 by the addition of a new device 4 to the network 1.

As described above, in a typical system 1, there is one network power supply 52 which generates a 24 volt power supply signal, and many power consuming devices 4. The master controller 70 monitors the scBattDisable signal 59. In some cases, a larger dedicated power supply 60 may be connected to one of the node controllers 2 within the network 1. In that case the larger power supply 60 drives the scBattDisable signal 59 to a logical 1 signal. If the scBattDisable signal is driven to a logical 1 signal, indicating the presence of a higher capacity power supply than the network power supply 52, the master interface controller 70 communicates with the node interface controller 2 associated with the system power supply 52. That node interface controller 2, in turn, isolates the network power supply 52 from the network in order to prevent contention between the power supplies 52 and 60. This isolation feature is particularly advantageous when the network 1 is operating on a battery powered system supply 52 so as to prevent damaging current flow through the battery. Whenever the larger power supply 60 is disconnected from the node controller 2, the scBattDisable signal is returned to the undriven state, and the output of the system power supply 52 is restored and is thus able to maintain operation of the remainder of the network 1.

As described above, a point-to-point electrical signaling protocol is used for internode controller communication. For example, the asynchronous RS232 serial protocol may be utilized, or any other convenient data transfer protocol may be chosen. The node controller 2 contains the appropriate drivers 61. Typically, an isolated three wire RS232 interface cable 47 exists as conductor 37 within the system cable 3 throughout the network 1. The RS232 interface cable permits the virtual alarm signal (e.g. 73 of FIG. 3) described previously, or any other such desired signal, to be routed throughout the network 1.

Additional data communications capability is provided by two independent communications links 48 and 49 that are bundled within the system cable 3 on conductors 41 and 39 respectively. The additional communications links are available in the node interface controller 2 on conductors 48 and 49 and are compatible with at least one of: (a) the IEEE Ethernet standard, (b) a Bluetooth standard and/or (c) an IP protocol standard. The receive (Rx) and transmit (Tx) conductors reside within the system cable 3, and are crossed-over, so as to permit identically wired system connectors 5 to be connected between nodes. In the illustrated embodiment, these additional data communication links are Ethernet links (Ethernet1 and Ethernet2). The Ethernet links 48 and 49 are independent from each other as well as from the RS232 link. Conductor 36 conveys scStatus Tx and Rx RS232 compatible signals (FIG. 2).

At least one switch is operably connected to the second communication link (e.g. Ethernet1 and/or Ethernet2) so as to permit diagnosis of an individual device status by associating a particular device with the second communications link. Referring to FIG. 4, the master controller 70 may control the operation of Ethernet switches 21 and 22 to permit communication signals from one communication link, RS232, Ethernet1 and/or Ethernet2, to be connected to a second communications link in order to isolate communications from that device and determine whether the device is responding. Because Ethernet networks do not provide any information regarding the physical topology of the network 1, that is which devices are currently physically and electrically connected to the network 1, the master interface controller 70 would otherwise have difficulty in determining if one of the devices 4 has failed or has been disconnected from the network 1. However, because the master interface controller 70 is able to access the map 50 of the physical layout of the hardware present on the network 1, it is able to track errors that are detected to a specific hardware item. Further the individual interface controller 2 identified as the master controller 70, may use the map, compiled as described above, in identifying a particular device in the network which fails to respond to communication via the second communication link (e.g. Ethernet1 and/or Ethernet 2), different to the first communication link (e.g. RS232), being conveyed by the plurality of cable interface connections in the network 1. That is, individual node interface controllers 2 may access the map 50 and use the map data to identify a particular device 4 in the network 1 if that device 4 fails to respond to communication via either the Ethernet links 48 and 49 and/or the RS232 communication link 57.

Variations contemplated with respect to the description of the preferred embodiment may be implemented. Any system of instruments 4 which may benefit from a supervisory control network 1 that is independent of a communication network may advantageously use the principles of the present invention. The system of node controllers 2 may be used as the primary method of interconnection of networked products.

What is claimed is:

1. A system for monitoring cable interface connections between a cable and an associated device in a network, comprising:

a first interface controller for monitoring a connection between a cable and an associated device in the network, said cable and first interface controller supporting separate first and at least two second communication links;

a second interface controller automatically acquiring device type identification data from the first interface controller via first communication link and compiling from the acquired device type identification data a map of the network which includes information about physical topology of the network, said second interface controller supporting identification of a device in the network that fails to respond to a communication via one of the second communication links; and a switch that switches the communication from the one second communication link of the failed device to another of the second communication links of the failed device, different from said first communication link, to determine if the device is resuming communication in response to operation of the switch.

2. The system according to claim 1, wherein said compiled map comprises data identifying individual power consumption of individual devices from predetermined data associating a device type with a corresponding power consumption.

3. The system according to claim 1, wherein said compiled map comprises data identifying physical location of individual devices from predetermined data associating a device type with an individual cable interface connection and a physical location.

4. The system according to claim 3, wherein said predetermined data associates a device type with an individual cable interface connection and associated electronic address and physical location.

5. The system according to claim 1, wherein at least one interface controller is identified within a hierarchy of a plurality of interface controllers by means of at least one jumper connection that is configured within the interface controller.

6. The system according to claim 1, wherein at least one interface controller is associated with a particular type of device within a hierarchy of a plurality of interface controllers by means of at least one jumper connection that is configured within the interface controller.

7. The system according to claim 1, wherein the second communication links are compatible with at least one of, (a) the IEEE Ethernet standard, (b) a Bluetooth standard and (c) an IP protocol standard.

8. The system according to claim 1, wherein a patient monitoring signal is communicated to individual interface controllers via said first communication link.

9. The system according to claim 8, wherein said patient monitoring signal is at least one of, (a) an alarm signal, and (b) a patient vital sign representative signal.

10. The system according to claim 8, wherein said patient monitoring signal is an alarm signal that may be set to an active alarm condition by any interface controller of said plurality of individual interface controllers.

11. The system according to claim 8, wherein said patient monitoring signal is an alarm signal that is used to initiate an action by a device in the network.

12. A method for monitoring cable interface connections between a cable and an associated device in a network, comprising the steps of:

monitoring with a first interface controller a connection between a cable and an associated device in the network, said cable and first interface controller supporting separate first and at least two second communication links;

automatically acquiring, with a second interface controller, device type identification data from the first interface controller via first communication link and compiling from the acquired device type identification data a map of the network which includes information about physical topology of the network;

identifying with the second interface controller and from the mare a device in the network that fails to respond to a communication via one of the second communication links; and switching the communication from the one second communication link of the failed device to another of the second communication links of the failed device to determine if the device is responding following the switching of the communication.

13. The method according to claim 12, wherein a patient monitoring signal is communicated to individual interface controllers via said first communication link.

14. The method according to claim 13, wherein said patient monitoring signal is at least one of, (a) an alarm signal and (b) a patient vital sign representative signal.

15. The method according to claim 13, wherein said patient monitoring signal is an alarm signal that may be set to an active alarm condition by an interface controller of individual interface controllers.

16. The method according to claim 13, wherein said patient monitoring signal is an alarm signal that is used to initiate an action by a device in the network.

* * * * *